United States Patent
Seo

(10) Patent No.: US 10,721,024 B2
(45) Date of Patent: Jul. 21, 2020

(54) ERROR RECOVERY METHOD AND DEVICE FOR SAME USING MULTICHANNEL IN WIRELESS COMMUNICATION SYSTEM

(71) Applicant: LG ELECTRONICS INC., Seoul (KR)

(72) Inventor: Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 85 days.

(21) Appl. No.: 16/067,794

(22) PCT Filed: Jan. 6, 2017

(86) PCT No.: PCT/KR2017/000210
§ 371 (c)(1),
(2) Date: Jul. 2, 2018

(87) PCT Pub. No.: WO2017/119771
PCT Pub. Date: Jul. 13, 2017

(65) Prior Publication Data
US 2019/0013902 A1    Jan. 10, 2019

Related U.S. Application Data

(60) Provisional application No. 62/276,229, filed on Jan. 8, 2016.

(51) Int. Cl.
*H04L 1/18* (2006.01)
*H04L 1/08* (2006.01)
*H04L 1/00* (2006.01)
*H04L 12/18* (2006.01)
*H04W 88/02* (2009.01)

(52) U.S. Cl.
CPC .............. *H04L 1/08* (2013.01); *H04L 1/00* (2013.01); *H04L 1/18* (2013.01); *H04L 1/1819* (2013.01); *H04L 12/189* (2013.01); *H04L 2001/0093* (2013.01); *H04W 88/02* (2013.01)

(58) Field of Classification Search
CPC ..... H04L 1/08; H04L 1/00; H04L 1/18; H04L 1/1819; H04W 88/02
See application file for complete search history.

(56) References Cited

U.S. PATENT DOCUMENTS 9,474,057 B2 * 10/2016 Kwon ................... H04L 5/0055
9,686,067 B2 *  6/2017 Loehr .............. H04W 72/0413
9,762,356 B2 *  9/2017 Rudolf ............. H04W 72/0446
(Continued)

FOREIGN PATENT DOCUMENTS

WO    2008110894 A2    9/2008

*Primary Examiner* — Esaw T Abraham
(74) *Attorney, Agent, or Firm* — Dentons US LLP

(57) ABSTRACT

In the present application, a method is disclosed for receiving data from a base station by means of a terminal in a wireless communication system. In particular, the method comprises the steps of: receiving the data from the base station through a multicast channel; when decoding of the data is unsuccessful, transmitting a retransmission request signal for the data to the base station; and receiving a retransmission of the data from the base station through a unicast channel, wherein the data received through the multicast channel and the data received through the unicast channel are characterized by including the same transport block having mutually different and dissimilar RVs (Redundancy Versions).

4 Claims, 8 Drawing Sheets

S701. Initial transmission via multicast channel

S702. Feedback on the need for error recovery

S703. Retransmission via unicast channel

(56) References Cited

U.S. PATENT DOCUMENTS

| | | | |
|---|---|---|---|
| 9,763,060 B2* | 9/2017 | Zou | H04W 4/06 |
| 9,806,896 B2* | 10/2017 | Xiang | H04L 12/1868 |
| 9,847,853 B1* | 12/2017 | Patel | H04L 1/1812 |
| 2004/0081181 A1* | 4/2004 | Malkamaki | H04L 1/0031 |
| | | | 370/410 |
| 2009/0279480 A1 | 11/2009 | Rosenqvist et al. | |
| 2012/0099419 A1 | 4/2012 | Kim et al. | |
| 2012/0147830 A1* | 6/2012 | Lohr | H04W 72/042 |
| | | | 370/329 |
| 2013/0163444 A1 | 6/2013 | Tee et al. | |
| 2013/0315124 A1 | 11/2013 | Rapaport et al. | |
| 2014/0079006 A1 | 3/2014 | Wu | |
| 2014/0362832 A1* | 12/2014 | Rudolf | H04W 72/0413 |
| | | | 370/336 |
| 2015/0326341 A1* | 11/2015 | Lorca Hernando | H04L 1/0041 |
| | | | 370/328 |
| 2016/0359589 A1* | 12/2016 | Belleschi | H04L 5/0055 |

* cited by examiner

FIG. 2
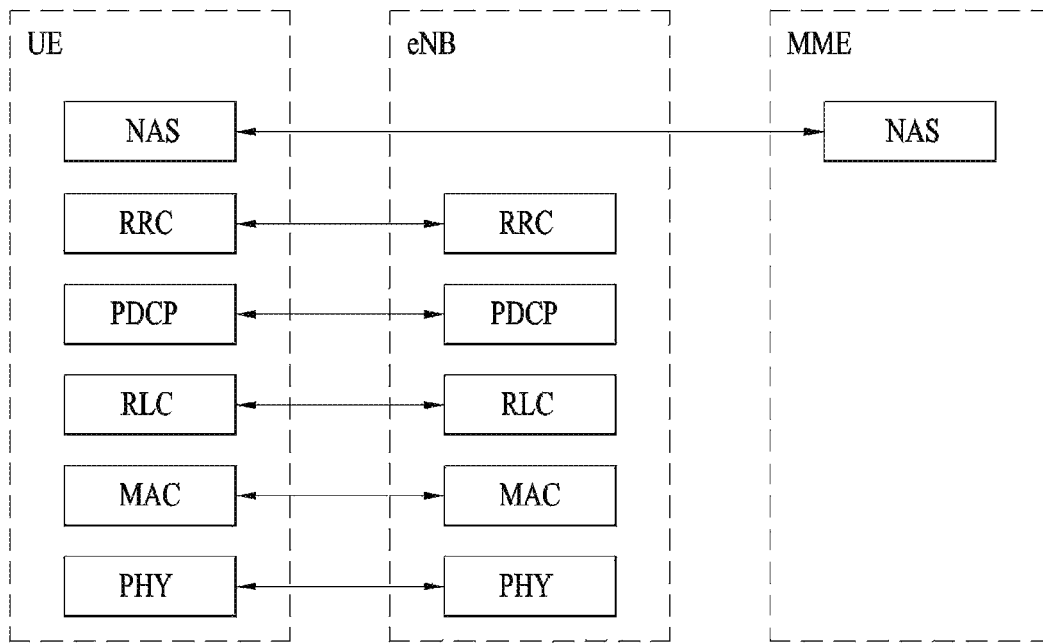
(A) CONTROL-PLANE PROTOCOL STACK
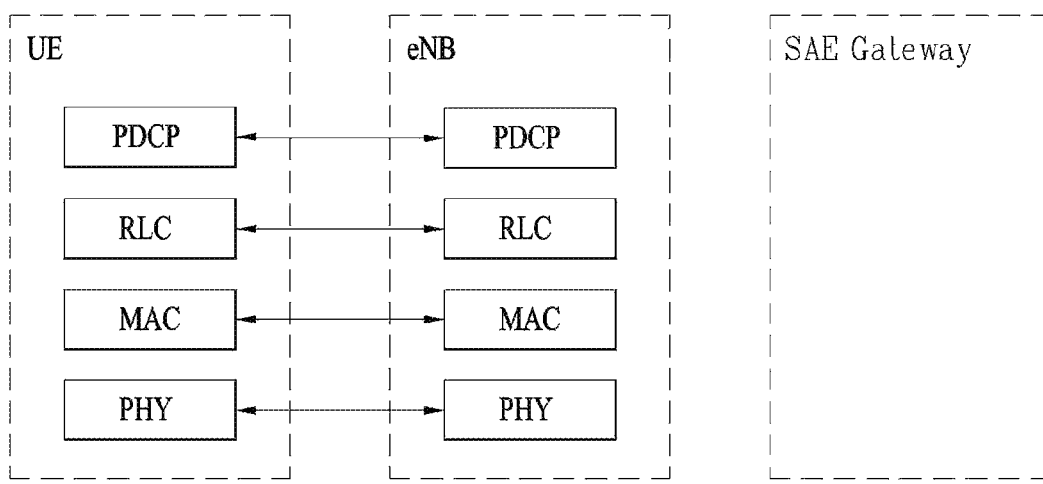
(B) USER-PLANE PROTOCOL STACK S701. Initial transmission via multicast channel S702. Feedback on the need for error recovery S703. Retransmission via unicast channel S801. Normal communication from the serving cell S802. Link failure occurs and the recovery is triggered.

S803. Recovery communication from the serving and neighboring cells

ERROR RECOVERY METHOD AND DEVICE FOR SAME USING MULTICHANNEL IN WIRELESS COMMUNICATION SYSTEM

This application is a National Stage Application of International Application No. PCT/KR2017/000210, filed on Jan. 6, 2017, which claims the benefit of U.S. Provisional Application No. 62/276,229, filed on Jan. 8, 2016, all of which are hereby incorporated by reference in their entirety for all purposes as if fully set forth herein.

TECHNICAL FIELD

The present invention relates to a wireless communication system, and more particularly, to a method of recovering an error using multiple channels in a wireless communication system and apparatus therefor.

BACKGROUND ART

As an example of a wireless communication system to which the present invention is applicable, a $3^{rd}$ Generation Partnership Project (3GPP) Long Term Evolution (LTE) communication system will be schematically described.

FIG. 1 is a diagram showing a network structure of an Evolved Universal Mobile Telecommunications System (E-UMTS) as a mobile communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "$3^{rd}$ Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE OF THE INVENTION

Technical Task

Based on the aforementioned discussion, the technical task of the present invention is to propose a method of recovering an error using multiple channels in a wireless communication system and apparatus therefor.

Technical Solutions

In one technical aspect of the present invention, provided herein is a method of receiving data from a base station by a user equipment in a wireless access system, including receiving the data from the base station through a multicast channel, when a decoding failure of the data occurs, transmitting a retransmission request signal for the data to the base station, and receiving a retransmission of the data from the base station through a unicast channel, wherein each of the data received through the multicast channel and the data received through the unicast channel include a same transport block having a different RV (redundancy version).

Preferably, the receiving the retransmission of the data from the base station through the unicast channel may include receiving a control signal for the reception of the data retransmission. Here, the control signal may include information on the multicast channel and information on a timing point at which the data is received through the multicast channel. Or, the retransmission request signal may include information on the multicast channel and information on a timing point at which the data is received through the multicast channel.

Additionally, the method may further include reporting channel state information to the base station. Here, a precoding and MCS (modulation and coding scheme) level determined on the basis of the channel state information may be applied to the unicast channel.

More preferably, if the retransmission request signal is transmitted over a preset count, the method may further include receiving recovery data of the data from the base station and an adjacent base station of the base station. Here, the receiving the recovery data may include receiving the recovery data through a first recovery data specific resource corresponding to the base station and a second recovery data specific resource corresponding to the adjacent base station.

In another technical aspect of the present invention, provided herein is a user equipment in a wireless communication system, including a wireless communication module and a processor connected to the wireless communication module, the processor configured to receive the data from the base station through a multicast channel, transmit a retransmission request signal for the data to the base station when a decoding failure of the data occurs, and receive a retransmission of the data from the base station through a unicast channel, wherein each of the data received through the multicast channel and the data received through the unicast channel include a same transport block having a different RV (redundancy version).

Preferably, the processor may receive a control signal for the reception of the data retransmission and the control signal may include information on the multicast channel and information on a timing point at which the data is received through the multicast channel. Or, the retransmission request signal may include information on the multicast channel and information on a timing point at which the data is received through the multicast channel.

Additionally, the processor may report channel state information to the base station and a precoding and MCS (modulation and coding scheme) level determined on the basis of the channel state information may be applied to the unicast channel.

More preferably, if the retransmission request signal is transmitted over a preset count, the processor may receive recovery data of the data from the base station and an adjacent base station of the base station. And, the processor may receive the recovery data through a first recovery data specific resource corresponding to the base station and a second recovery data specific resource corresponding to the adjacent base station.

Advantageous Effects

According to an embodiment of the present invention, a time taken to recover packet error or link failure occurring in the course of performing wireless communication can be reduced and resource efficiency can be raised.

The effects of the present invention are not limited to the above-described effects and other effects which are not described herein will become apparent to those skilled in the art from the following description.

DESCRIPTION OF DRAWINGS

FIG. 2 is a diagram illustrating structures of a control plane and a user plane of a radio interface protocol between a UE and an E-UTRAN based on the 3GPP radio access network specification.

BEST MODE FOR INVENTION

Figure 1:
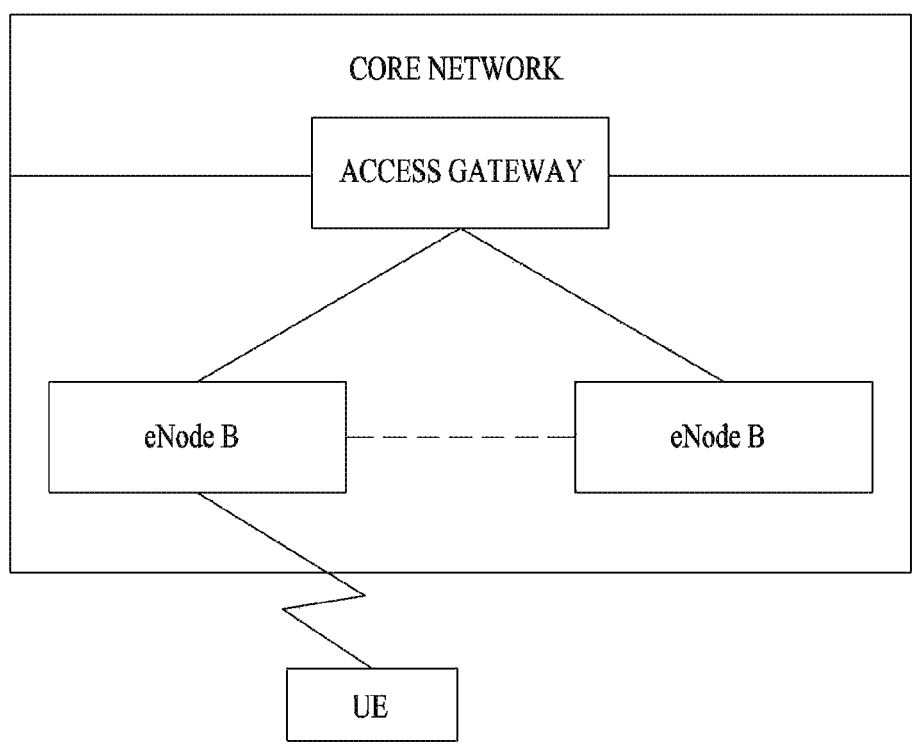
FIG. 1 is a diagram schematically illustrating a network structure of an E-UMTS as an exemplary radio communication system.

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. Moreover, although the present specification describes embodiments of the present invention with reference to FDD, this is just exemplary. Embodiments of the present invention can be easily modified and applied to H-FDD or TDD.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottom most portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
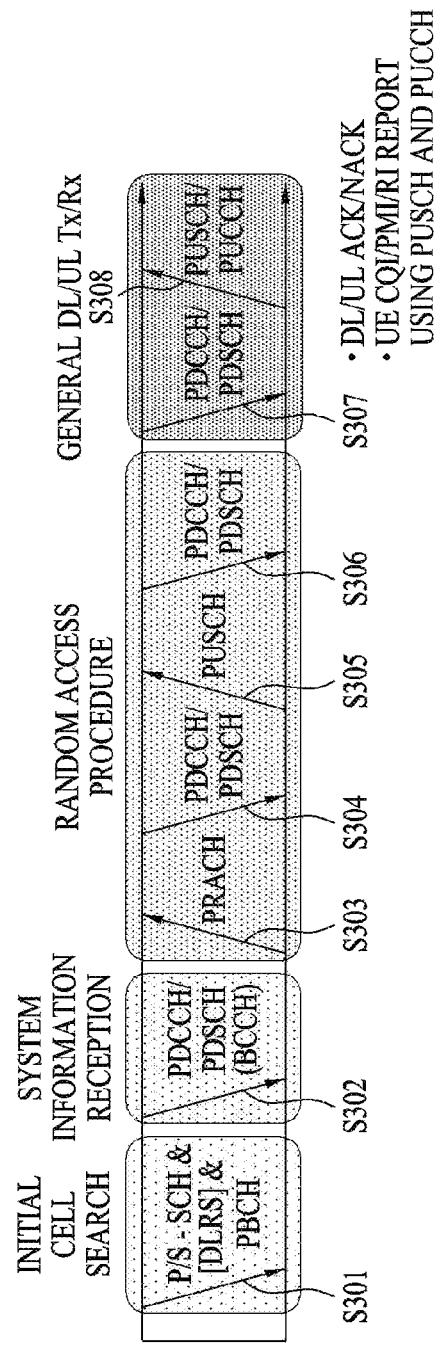
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
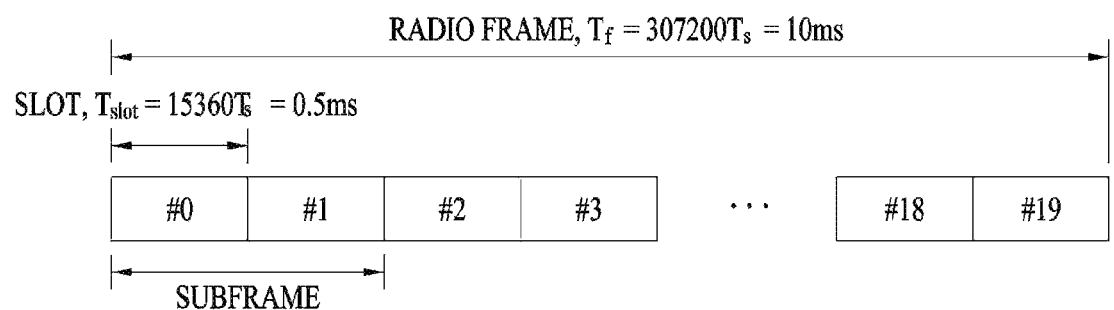
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms ($327200 \times T_s$) and includes 10 equal-sized subframes. Each of the subframes has a length of 1 ms and includes two slots. Each slot has a length of 0.5 ms (15360 $T_s$). In this case, $T_s$ denotes a sampling time represented by $T_s=1/(15 \text{ kHz} \times 2048)=3.2552 \times 10^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
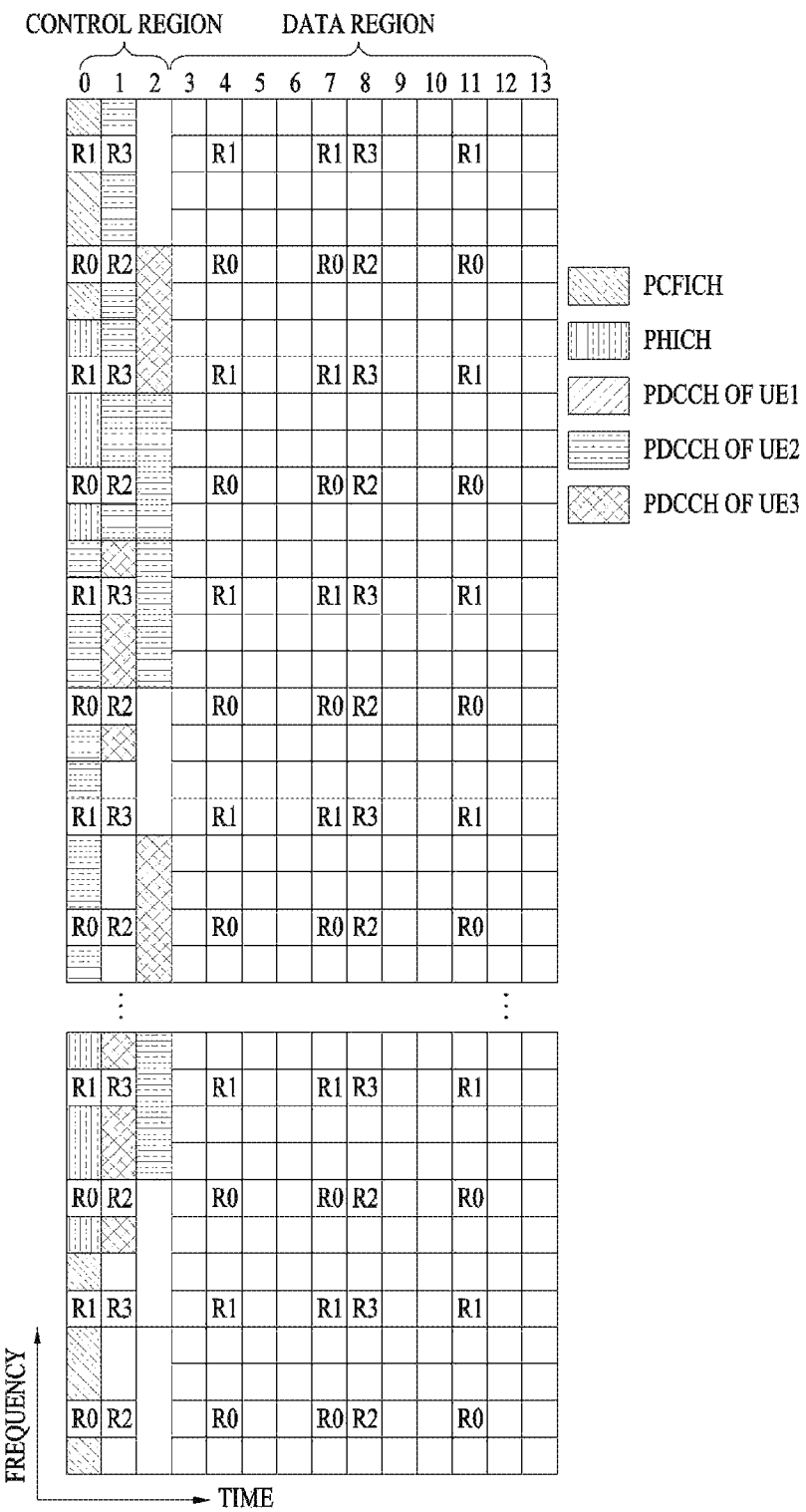
FIG. 5 is a diagram illustrating the structure of a DL radio frame used in an LTE system.

FIG. 5 is a diagram illustrating control channels included in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
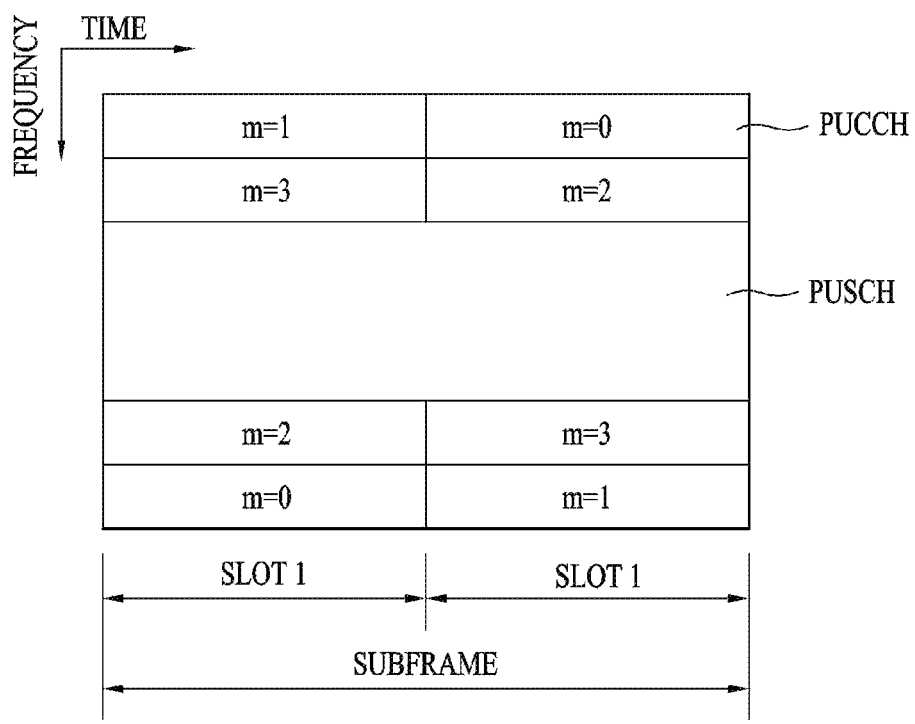
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

The present invention proposes a method of effectively recovering packet error and link failure occurring in the course of performing communication between a wireless communication network and a UE. Here, 'recovering packet error' means a process for enabling a UE to successfully receive a specific data packet through an appropriate retransmission in case that the UE fails in receiving the corresponding packet transmitted by a network at a specific timing. And, 'recovering link failure' means a process for, if it is difficult to perform normal communication due to a degraded channel quality between a serving cell and a UE, maintaining minimum communication through communication of a different type, e.g., a transmission from a cell other than the serving cell. Yet, the operating principles described in the present invention are applicable to a direct communication process between UEs. In this case, a Tx (transmitting) UE can perform an operation similar to that of a wireless communication network mentioned in the following. For example, in an inter-UE direct communication process, an initial transmission is performed through a multicast channel by targeting a multitude of UEs but a retransmission can be performed through a unicast channel by targeting a specific UE.

1) Error Recovery for Downlink Multicast Transmission

First of all, described is a method of effectively recovering error in broadcast and multicast transmission of transmitting the same data in downlink to a plurality of UEs. Here, broadcast and multicast may appear in a manner that a single cell transmits data using a reference signal and format similar to those of the existing unicast transmission, or in a manner that a plurality of cells transmit the same data using a separate reference signal and format (particularly, a reference and signal configured to appropriately combine signals arriving from a plurality of cells) different from those of the unicast. The former can be named SC-PTM (single cell point-to-multipoint), and the latter can be named MBSFN (multicast and broadcast in single frequency network).

One of features of the broadcast and multicast transmissions may include a fact that a scheduling message for the transmission can be transmitted not to an individual UE but to a plurality of UEs together. For example, a scheduling message can be transmitted in a common search space in which all UEs perform monitoring together, or a scheduling message can be transmitted on a sort of broadcast and multicast channels as well.

In case that a network transmits specific data through a multicast channel, some of a series of UEs receiving the specific data may fail in data reception. Particularly, if the specific data is important data that should be received at a high probability (e.g., as a UE is installed in a car, in case of receiving road situations of surrounding areas or information essential for car driving like a map), the network retransmits the corresponding data so as to enable the reception to be successful. Such a process can be named error recovery. In the retransmission for error recovery of multicast data, it is possible to reuse the multicast channel.

Yet, this scheme has a disadvantage that it is unable to perform a transmission optimized for a situation of an individual UE. Particularly, as a reception of a corresponding data is important, if an error probability in an initial transmission through a multicast channel is set to a sufficiently low value, the number of UEs that require retransmissions will be lowered considerably. In this case, if a multicast channel targeting a multitude of unspecific UEs is reused for retransmission, it is disadvantageous in that it is unable to use a transmission optimized for an individual UE that requires a retransmission actually. For example, operations such as precoding or MCS (modulation and coding scheme) configuration reflecting a channel state of a retransmission requiring UE, application of a mitigation scheme of adjacent cell interference, a use of carrier differently aggregated by each UE and the like will all become impossible.

To resolve the above disadvantage, in case of retransmitting data, which used a multicast channel targeting a multitude of unspecific UEs in an initial transmission, for error recovery, the present invention proposes to use a unicast channel targeting a UE having failed in reception of the initial transmission.

Namely, a UE attempts a reception of an initial transmission of a desired data through a multicast channel. In case of failure in the reception of the initial transmission, such failure is notified to a network so that the corresponding data is retransmitted. And, this retransmission is performed through a unicast channel. An operation proposed by the present invention may be used as the only error recovery scheme of an initial transmission through a multicast channel and may be applicable as an alternative for using a unicast channel in a situation that both of the multicast channel and the unicast channel are available for a retransmission.

Figure 7:
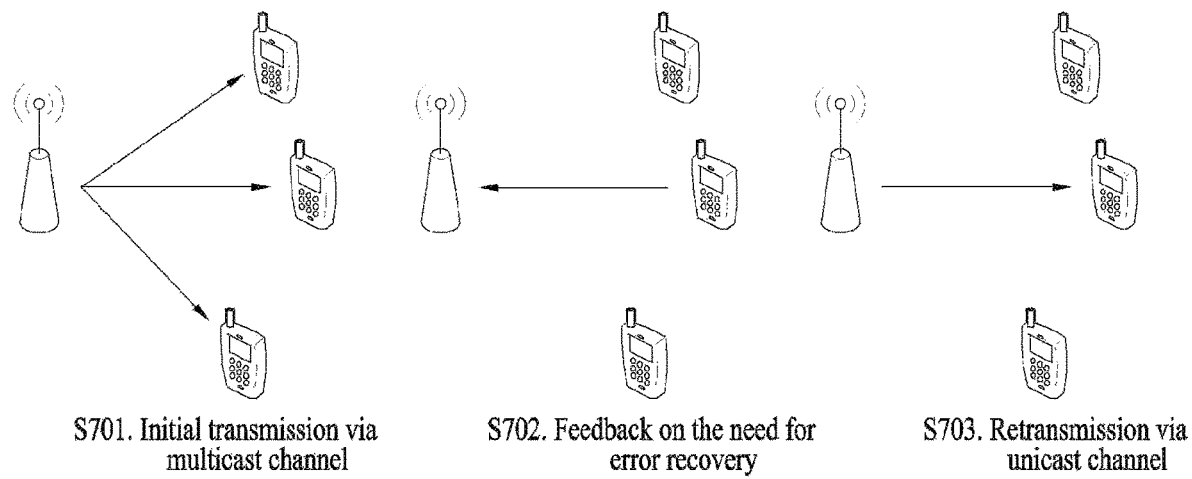
FIG. 7 shows an example of performing error recovery for a downlink multicast transmission according to an embodiment of the present invention.

FIG. 7 shows an example of performing error recovery for a downlink multicast transmission according to an embodiment of the present invention.

Referring to FIG. 7, in a step S701, a base station transmits data using a multicast channel by targeting a multitude of unspecific UEs. In a step S702, a UE having failed in an initial reception of the data sends feedback information, which indicates the reception failure and/or the necessity for error recovery, to the base station. Finally, in a step S703, the base station performs retransmission of the corresponding data to the corresponding UE through a unicast channel.

If the retransmission of the multicast channel through the unicast channel is performed, the following advantages are provided.

A network obtains a channel state of an individual UE and is able to use a precoding or MCS level optimal for the corresponding state. As a result, it is able to raise transmission efficiency in preparation for a multicast channel that does not use a precoding or MCS level reflecting the channel state.

In case that a specific UE is located near a specific adjacent cell, a retransmission can be performed by applying a scheme of alleviating interference of the corresponding adjacent cell. For example, it is able to perform a retransmission using a time/frequency resource agreed not to be used by the adjacent cell. A different UE may receive interference from a different cell and an interference alleviating scheme and a low interference resource applied by the adjacent cell may be different. Hence, an appropriate interference alleviating scheme differs depending on a location of an individual UE.

Since a UE aggregates carriers of different combinations according to capability and operating situation of its own and then performs communication, it is able to perform a reception of a retransmission using an appropriate carrier, e.g., a less-loaded carrier, among the carriers aggregated by an individual UE.

An operation of the present invention is described in detail according to a protocol layer that processes a retransmission as follows.

According to a first method, a retransmission of a multicast channel through a unicast channel can be performed in a MAC layer. In another sense, a retransmission is performed through an HARQ process. In this case, since an initial transmission trough a multicast channel and a retransmission through a unicast channel are different RVs (redundancy versions) of the same transport block and may be performed in a manner of transmitting a different part on a codeword obtained by applying a predetermined information bit to a channel encoder. In this case, a receiving UE can raise probability of error recovery by combining the initial transmission through the multicast channel and the retransmission through the unicast channel together. To this end, the receiving UE should store some soft bits of the initial transmission through the multicast channel.

It is necessary to specify that each retransmission of a multicast channel through a unicast channel corresponds to an initial transmission occurring on a prescribed multicast channel in a prescribed time. To this end, each retransmission through a unicast channel can have an indicator indicating that the corresponding retransmission corresponds to an initial transmission occurring on a prescribed multicast channel in a prescribed time. In particular, an index of a multicast channel and a multicast channel transmitted timing, e.g., an indicator delivering information on a subframe index can be signaled through a physical control channel. This can be implemented in a manner that a separate indicator is contained in the physical control channel.

For another example, a UE attempting to apply error recovery through a unicast channel among UEs attempting to receive a multicast channel can report such a fact to a network, and the network can instruct some of HARQ processes, which are used for a unicast, to be assigned to a specific multicast channel. Here, the HARQ process means a pipeline for performing an independent HARQ operation. In LTE system the number of DL HARQ processes is defined as 8 to the maximum. In such a case, when a UE attempts receptions of initial transmissions of two kinds of services through a multicast channel # X and a multicast channel # Y, respectively, a base station can instruct HARQ process # n and HARQ process # m to be assigned to the multicast channel # X and the multicast channel # Y, respectively. When the base station uses the HARQ process # n or the HARQ process # n for a transmission through a unicast channel, the UE can operate to recognize it as a retransmission for the multicast channel # X or the multicast channel # Y.

A retransmission of a multicast channel through a unicast channel in the above manner may be provided to follow several attributes of an initial transmission through a multicast channel. For example, in performing a scrambling on a codeword, by applying a scrambling scheme of a multicast channel corresponding to an initial transmission, e.g., by applying an initial value generating a scrambling sequence to a unicast channel intactly, two channels can be decoded by being combined together.

If a retransmission is performed in a MAC layer, a UE reports a success/failure in an initial transmission reception to a base station through HARQ-ACK. In this case, PUCCH is usable for HARQ-ACK feedback, and a separate PUCCH resource is usable to be distinguished from HARQ-ACK for an initial transmission. Or, to prevent the waste of using a separate PUCCH resource, a new field is defined in a MAC header of PUSCH transmitted by a UE and an index of a multicast channel failing to be received by the UE and a timing point of transmitting the multicast channel may be included.

In this case, to reduce the number of necessary bits, a multicast channel transmitted timing information can operate to have a value ranging from 0 to A-1 by being delivered in form of mod (radio frame index*10+subframe index, A). Yet, since it is impossible to distinguish multicast channel transmissions of two timing points spaced apart from each other over A subframe from each other, feedback through PUSCH transmission of UE should be performed before that.

According to a second method, a retransmission can be performed in a layer higher than a MAC layer. Namely, ARQ operation is performed in a layer higher than a MAC layer, and ARQ in an RLC layer can become one example. In this case, as an initial transmission through a multicast channel and a retransmission through a unicast channel are not performed through a single HARQ process, a process in a physical layer is separated.

A UE first attempts a reception of an initial transmission through a multicast channel. In case of a reception failure, if the UE reports the reception failure to a network, the network retransmits the corresponding data through a unicast channel. The Two transmissions can be processed as separate transport blocks. In a UE side ARQ responsible layer, if a reception failure of a specific ARQ unit is detected, a message for feedback of the detection is created and the UE reports this feedback message to the network through a PUSCH transmission. Or, the aforementioned MAC header using feedback can be used. Hence, although the network performs a retransmission using a unicast channel, an indicator for distinguishing the transmission from a general unicast transmission is included. For example, an indicator indicating a transmission for a prescribed ARQ unit of a prescribed multicast channel or a prescribed bearer can be included.

Such an operation may be implemented in a manner of mapping the same service or bearer to both of the multicast channel and the unicast channel. Namely, after mapping the same service or bearer to both of the multicast channel and the unicast channel, an initial transmission may operate to use a multicast channel and a retransmission may operate to use a unicast channel.

2) Recovery for Link Failure with Serving Cell

A UE may have a degraded link quality with a serving cell depending on a location. if so, a link failure occurs and communication through the serving cell may become difficult. Particularly, when a UE moves fast to a specific target cell from a serving cell, as a quality of the serving cell is degraded in general, the UE normally makes a handover into the target cell. Yet, as the UE gets too far from the serving cell before ending the handover due to a time delay generated from making the handover, the handover fails and a link failure occurs frequently. If such a link failure occurs, the UE is unable to receive data until reconfiguring another cell as a serving cell and then establishing a connection to the new serving cell. In such a situation, if the corresponding data includes significant information that should be received quickly, it can cause a considerable problem to a communication service.

To solve such a problem, if a link failure occurs in a serving cell or a situation of a possible link failure occurs, the present invention proposes to enable a communication to continue by transmitting data from the serving cell and/or an adjacent cell. The data transmitted by the serving cell and/or the adjacent cell may include a signal transmitted from an individual cell. Yet, several cells the same signal to an SFN (single frequency network), thereby enabling a transmission of higher power. Moreover, although a unicast channel targeting a corresponding UE only may be available, since whereabout of the corresponding UE is not obtained or an adjacent cell may not obtain an ID (e.g., C-RNTI) used by the corresponding UE, it is possible to use a multicast channel that targets a multitude of unspecific UEs. Such an operation shall be named a link failure recovery using multiple cells.

Figure 8:
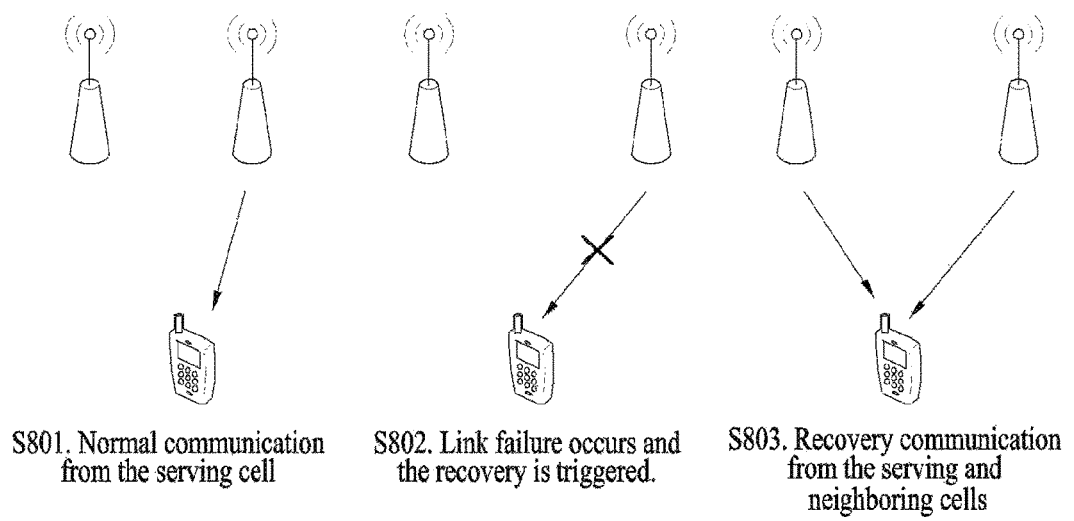
FIG. 8 shows an example of a process for recovering link failure with a serving cell according to an embodiment of the present invention.

FIG. 8 shows an example of a process for recovering link failure with a serving cell according to an embodiment of the present invention.

Referring to FIG. 8, in a step 801, a UE is performing general communication with a serving cell. Yet, in a step S802, a link failure with the serving cell occurs. And, it can be observed that a link failure recovery process of the present invention is triggered. In such a case, in the step S803, as the serving cell and an adjacent cell transmit data, the UE maintains the communication service. Particularly, the data transmitted by the serving cell and the adjacent cell may include a signal transmitted from an individual cell or the same signal as transmitted together by the serving cell and the adjacent cell to an SFN.

The aforementioned method of initiating a link failure recovery using multiple cells is described in detail as follows. First of all, a network can determine whether to initiate the recovery based on HARQ-ACK reporting for data transmitted to a specific UE. If HARQ-ACK for the data transmitted to the specific UE is not reported continuously, a link failure recovery using multiple cells can be initiated on the assumption that a link failure occurs in the corresponding UE. A serving cell may request an adjacent cell to participate in a link failure recovery. If there is a network entity configured to control such an operation, the serving cell may request the corresponding entity to initiate the link failure recovery. In this request information, information such as an ID of a corresponding UE, an attribute of a service, a data to be transmitted through a recovery, a time/frequency resource for triggering a recovery transmission, a parameter to be used for a recovery transmission (e.g., a parameter for generating a reference signal sequence or a scrambling sequence) can be included.

If a link quality of a serving cell is degraded, a UE can initiate a link failure recovery process. In particular, if an RSRP (reference signal received power) or RSRQ (reference signal received quality) of the serving cell becomes equal to or lower than a predetermined level, the process can be initiated. Or, the operation can be performed on the assumption that a link quality of the serving cell is poor in a time interval in which a presence or non-presence of communication with the serving cell is uncertain in the course of a series of procedures performed by the UE in communicating with the serving cell. Detailed examples of such a time interval are described as follows.

Time interval for a timer T310 to run: T310 starts to run if an event that a UE determines that BLER (block error rate) transmitted from a serving cell is equal to or higher than a predetermined level occurs in succession several times in a radio link monitoring process. If an event of determining that BLER (block error rate) is lower than the predetermined level occurs in succession several times, T310 stops. Since a channel state of the serving cell is so poor as not to receive PDCCH stably during the running of T310, the above-described operation can be allowed.

Time interval for a timer T311 to run: T311 starts to run if an RRC connection re-establishment procedure starts. If a suitable cell is selected, T311 stops. Since the re-establishment procedure does not end yet during the running of T311, a transmission to a serving cell is not stable and the above-described operation can be allowed.

Time interval for a timer T301 to run: T301 starts to run if a UE transmits an RRC connection re-establishment request. If an RRC connection re-establishment message is received from a serving cell or the RRC connection re-establishment request is rejected, T301 stops. Since the RRC connection re-establishment procedure does not end yet during the running of T301, a transmission to the serving cell is not stable and the above-described operation can be allowed.

If a link failure recovery operation is initiated, a UE should be able to receive a data packet transmitted through the recovery process. A scheduling resource of the data packet transmitted through the recovery process can be designated in advance. For example, a site candidate of a packet transmission can appear periodically in a specific time/frequency space. Various parameters of the packet transmission, e.g., an MCS level can be fixed. Or, a search space of a physical control channel for scheduling data transmitted through the recovery process can be designated. Preferably, this search space may include a common search space monitored by all UEs. Or, in order to reduce detection complexity of UE, such scheduling information may be provided so as to be transmitted in a previously determined partial time only.

A data packet in a link failure recovery may be transmitted not only by a serving cell but also by an adjacent cell. Hence, a UE should attempt a reception by considering possibility of transmission from an adjacent cell. If a scheduling resource of a data packet is determined in advance, the UE attempts a reception of a transmission from an adjacent cell. Preferably, a recovery data packet transmission resource in a different cell can be separated in a time or frequency, and a network informs the UE what kind of a cell can transmit it on a prescribed resource. If a recovery data packet is scheduled through a physical control channel, the UE monitors candidates capable of transmitting this scheduling information in an adjacent cell. Likewise, candidates in the difference cell can be separated in a time or frequency.

In case that an adjacent cell transmits recovery data or scheduling information, it may be difficult to directly use an ID of an individual UE for physical layer signal generation. Here, 'to directly use for physical layer signal generation' may mean to use an ID of a UE, and more particularly, a relatively short ID utilized in a physical layer. Hence, such a part may be configured with a previously determined specific ID. Yet, an indicator indicating that a data packet is provided for a prescribed UE can be included in the corresponding data, e.g., through a MAC header. For example, the indicator may include a relatively long ID utilized by a higher layer. Specifically, if CRC scrambling of a physical control channel is generated as an ID of UE, ID for scrambling CRC of a control channel, which schedules recovery data, can be designated in advance.

While a link failure recovery is operating, a UE can continuously monitor a serving cell. This is because an event of receiving data from the serving cell may occur before a network resource drives a recovery owing to a channel state, which becomes good again, of the serving cell.

Figure 9:
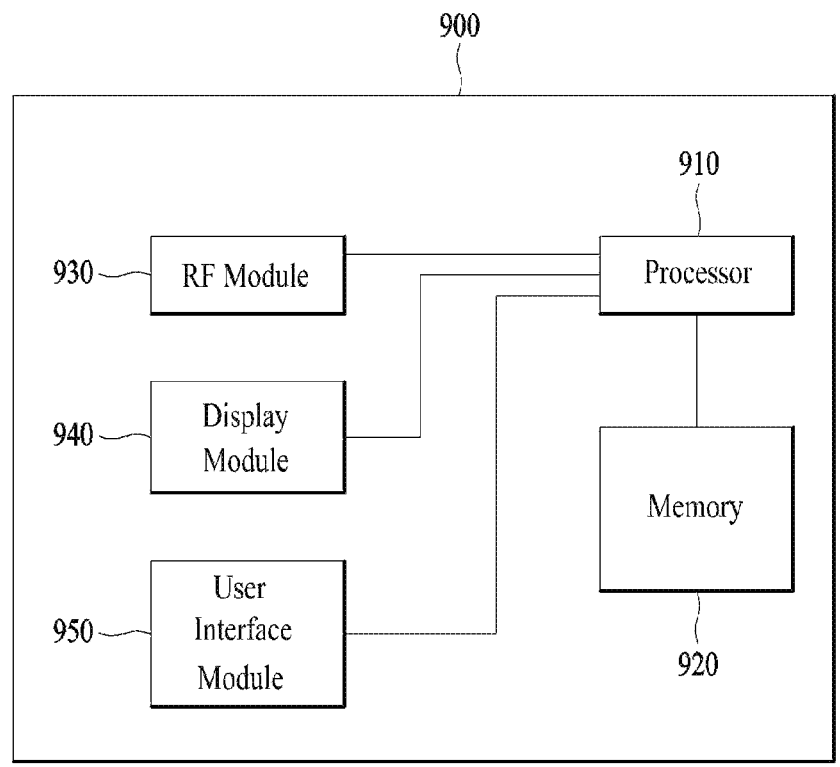
FIG. 9 is a block diagram of a communication apparatus according to an embodiment of the present invention.

FIG. 9 is a block diagram of a communication apparatus according to an embodiment of the present invention.

Referring to FIG. 9, a communication apparatus 900 includes a processor 910, a memory 920, a Radio Frequency (RF) module 930, a display module 940 and a user interface module 950.

The communication apparatus 900 is shown for convenience of description and some modules thereof may be omitted. In addition, the communication apparatus 900 may further include necessary modules. In addition, some modules of the communication apparatus 900 may be subdivided. The processor 910 is configured to perform an operation of the embodiment of the present invention described with respect to the drawings. For a detailed description of the operation of the processor 910, reference may be made to the description associated with FIGS. 1 to 8.

The memory 920 is connected to the processor 910 so as to store an operating system, an application, program code, data and the like. The RF module 930 is connected to the processor 910 so as to perform a function for converting a baseband signal into a radio signal or converting a radio signal into a baseband signal. The RF module 930 performs analog conversion, amplification, filtering and frequency up-conversion or inverse processes thereof. The display module 940 is connected to the processor 910 so as to display a variety of information. As the display module 940, although not limited thereto, a well-known device such as a Liquid Crystal Display (LCD), a Light Emitting Diode (LED), or an Organic Light Emitting Diode (OLED) may be used. The user interface module 950 is connected to the processor 910 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes than the base station. The term "Base Station" may be replaced with the terms fixed station, Node-B, eNode-B (eNB), or access point as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the above-described method of recovering an error using multiple channels in a wireless communication system and apparatus therefor are described by focusing on an example applied to the 3GPP LTE system, they are applicable to various wireless communication systems as well as to the 3GPP LTE system.

What is claimed is:

1. A method of receiving data from a base station by a user equipment in a wireless access system, the method comprising:

receiving the data from the base station through a multicast channel;

transmitting a retransmission request signal for the data to the base station when a decoding failure of the data occurs; and receiving a retransmission of the data from the base station through a unicast channel, wherein each of the data received through the multicast channel and the data received through the unicast channel include a same transport block having a different RV (redundancy version), wherein if the retransmission request signal is transmitted over a predetermined count, the method further comprises receiving recovery data of the data from an adjacent base station of the base station using a predefined recovery data specific resource for the adjacent base station.

2. The method of claim 1, the receiving the retransmission of the data from the base station through the unicast channel, comprising receiving a control signal for the reception of the data retransmission, wherein the control signal includes information on the multicast channel and information on a timing point at which the data is received through the multicast channel.

3. The method of claim 1, wherein the retransmission request signal includes information on the multicast channel and information on a timing point at which the data is received through the multicast channel.

4. The method of claim 1, further comprising reporting channel state information to the base station, wherein a precoding and MCS (modulation and coding scheme) level determined on the basis of the channel state information are applied to the unicast channel.

* * * * *